United States Patent
Cho et al.

(10) Patent No.: US 10,230,113 B2
(45) Date of Patent: Mar. 12, 2019

(54) CATHODE, LITHIUM BATTERY INCLUDING THE SAME, AND METHOD OF PREPARING THE CATHODE

(71) Applicant: Samsung SDI Co., Ltd., Yongin-si, Gyeonggi-do (KR)

(72) Inventors: Chae-Woong Cho, Yongin-si (KR); Myung-Duk Lim, Yongin-si (KR); Seung-Hun Han, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 105 days.

(21) Appl. No.: 14/535,154

(22) Filed: Nov. 6, 2014

(65) Prior Publication Data
US 2015/0214552 A1 Jul. 30, 2015

(30) Foreign Application Priority Data
Jan. 28, 2014 (KR) ........................ 10-2014-0010876

(51) Int. Cl.
| | | |
|---|---|---|
| H01M 4/66 | (2006.01) | |
| H01M 4/131 | (2010.01) | |
| H01M 4/04 | (2006.01) | |
| H01M 10/052 | (2010.01) | |
| H01M 4/1391 | (2010.01) | |
| H01M 4/74 | (2006.01) | |
| H01M 4/02 | (2006.01) | |

(52) U.S. Cl.
CPC ......... H01M 4/667 (2013.01); H01M 4/0404 (2013.01); H01M 4/131 (2013.01); H01M 4/1391 (2013.01); H01M 4/661 (2013.01); H01M 4/663 (2013.01); H01M 4/742 (2013.01); H01M 10/052 (2013.01); H01M 2004/028 (2013.01); H01M 2220/20 (2013.01); Y02E 60/122 (2013.01); Y02T 10/7011 (2013.01)

(58) Field of Classification Search
CPC ....... H01M 4/661; H01M 4/663; H01M 4/667
USPC .......................................................... 429/245
See application file for complete search history.

(56) References Cited

U.S. PATENT DOCUMENTS

| | | | |
|---|---|---|---|
| 7,235,193 B2 * | 6/2007 | Park ....................... | C01G 51/42 252/182.1 |
| 7,943,269 B2 | 5/2011 | Yates et al. | |
| 8,178,241 B2 | 5/2012 | Divigalpitiya et al. | |

(Continued)

FOREIGN PATENT DOCUMENTS

| | | | | |
|---|---|---|---|---|
| JP | WO 0042669 A1 * | 7/2000 | ............. | H01M 4/66 |
| JP | 2008-098590 A | 4/2008 | | |
| KR | 10-2001-0095626 A | 11/2001 | | |

OTHER PUBLICATIONS

Machine translation WO 0042669A1.*

*Primary Examiner* — Stewart A Fraser
*Assistant Examiner* — Victoria H Lynch
(74) *Attorney, Agent, or Firm* — Knobbe, Martens, Olson & Bear, LLP

(57) ABSTRACT

A cathode and method of preparing the cathode are disclosed. The cathode includes a current collector, and a cathode active material layer disposed on the current collector, wherein the current collector includes a metal substrate, and a conductive protective layer disposed on at least a portion of the metal substrate, and the conductive protective layer includes one or more of a protrusion and a recess which react with base, a lithium battery including the cathode, and a method of preparing the cathode.

10 Claims, 5 Drawing Sheets

(56) References Cited

U.S. PATENT DOCUMENTS

| | | | |
|---|---|---|---|
| 8,221,915 B2 | 7/2012 | Tikhonov et al. | |
| 2004/0106042 A1* | 6/2004 | Asari | H01M 4/0404 |
| | | | 429/232 |
| 2008/0220329 A1* | 9/2008 | Kojima | C04B 35/83 |
| | | | 429/188 |
| 2012/0288758 A1* | 11/2012 | Hosoe | H01G 11/06 |
| | | | 429/211 |
| 2013/0017442 A1* | 1/2013 | Cha | H01M 4/505 |
| | | | 429/211 |
| 2013/0022864 A1* | 1/2013 | Uchida | H01M 4/0404 |
| | | | 429/211 |
| 2013/0288138 A1* | 10/2013 | Tikhonov | H01M 4/38 |
| | | | 429/338 |

* cited by examiner

CATHODE, LITHIUM BATTERY INCLUDING THE SAME, AND METHOD OF PREPARING THE CATHODE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. For example, this application claims the benefit of Korean Patent Application No. 10-2014-0010876, filed on Jan. 28, 2014, in the Korean Intellectual Property Office, the disclosure of which is incorporated herein in its entirety by reference.

BACKGROUND

Field

The present disclosure relates to cathodes, lithium batteries including the cathodes, and methods of preparing the cathode.

Description of the Related Technology

Lithium batteries are used in various applications due to their high voltage and high energy density characteristics. For example, in the field of electric vehicles such as hybrid electric vehicles (HEVs) and plug-in hybrid electric vehicles (PHEVs), a lithium battery having high energy density is preferred because a prolonged operation at a high temperature is necessary and a large amount of electricity has to be charged or discharged during the operation. The characteristics of the lithium battery are affected by the anode, the electrolyte, the separator, and other components inside the battery.

In general, a cathode is prepared by coating a metal current collector with a cathode active material slurry and then drying the coated current collector. The cathode active material slurry is dried to form a cathode active material layer. When the cathode is prepared by using a water-based cathode active material slurry, the wettability of the cathode with respect to an electrolyte solution may decrease. In addition, the high-rate characteristics and lifetime characteristics of the lithium battery may degrade. Therefore, a cathode having increased wettability with respect to an electrolyte solution is in demand when it can be prepared using aqueous cathode active material slurry.

SUMMARY OF CERTAIN INVENTIVE ASPECTS

Provided are cathodes providing improved electrolyte solution wettability.

Provided are lithium batteries including the cathode.

Provided are methods of preparing the cathode.

Additional aspects will be set forth in part in the description which follows and, in part, will be apparent from the description, or may be learned by practice of the presented embodiments.

According to an aspect of the present invention, a cathode includes a current collector; and a cathode active material layer disposed on the current collector, wherein the current collector includes a metal substrate; and a conductive protective layer disposed on at least a portion of the metal substrate, and the conductive protective layer includes one or more of a protrusion and a recess which react with base.

According to another aspect of the present invention, a lithium battery includes the cathode.

According to another aspect of the present invention, a method of preparing a cathode includes: preparing a current collector that includes a metal substrate; and a conductive protective layer disposed on the metal substrate and including one or more of a protrusion and a recess which react with base; and coating the conductive protective layer with a cathode active material slurry.

BRIEF DESCRIPTION OF THE DRAWINGS

FIG. 1A is a surface image obtained immediately after coating a cathode plate prepared in Comparative Example 1 with an electrolyte solution; FIG. 1B is a surface image obtained after about 2 minutes passed after coating the cathode plate prepared in Comparative Example 1 with the electrolyte solution; FIG. 1C is a surface image obtained after about 10 minutes passed after coating the cathode plate prepared in Comparative Example 1 with the electrolyte solution; and FIG. 1D is a surface image obtained after about 20 minutes passed after coating the cathode plate prepared in Comparative Example 1 with the electrolyte solution.

FIG. 2A is a surface image obtained immediately after coating a cathode plate prepared in Example 1 with an electrolyte solution; FIG. 2B is a surface image obtained after about 5 minutes passed after coating the cathode plate prepared in Example 1 with the electrolyte solution; FIG. 2C is a surface image obtained after about 20 minutes passed after coating the cathode plate prepared in Example 1 with the electrolyte solution.

DETAILED DESCRIPTION OF CERTAIN INVENTIVE EMBODIMENTS

Figure 1A:
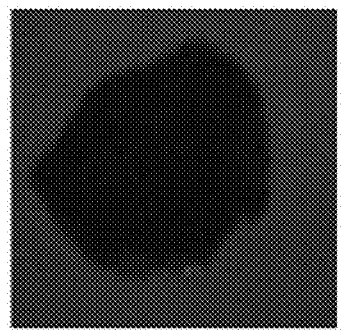
FIGS. 1A to 1D are non-limiting examples of surface images obtained after coating a cathode plate.
Figure 1B:
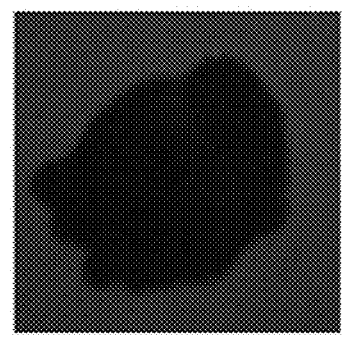
Figure 1C:
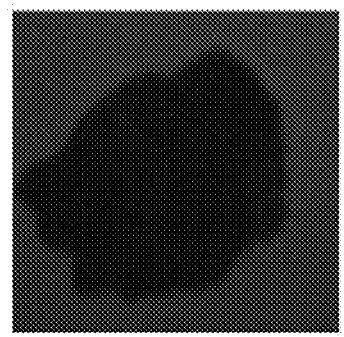

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, a cathode according to exemplary embodiments of the present disclosure, a lithium battery including the same, and a method of preparing the cathode are described in more detail.

In some embodiments, the cathode may include a current collector; and a cathode active material layer disposed on the current collector, wherein the current collector includes a metal substrate; and a conductive protective layer disposed on at least a portion of the metal substrate, and the conductive protective layer includes one or more of a protrusion and a recess which can react with base.

Since the conductive protective layer in the cathode includes the protrusion and/or the recess which react with base, a water-based cathode active material slurry can react with the protrusion and/or the recess to form pin-holes on the surface and also inside the cathode active material layer. Thus, electrolyte solution wettability may be increased. For example, the cathode active material layer and the current collector may be easily impregnated with an electrolyte solution by forming a plurality of through-holes having a nano-scale to micro-scale diameter which can penetrate through the cathode active material layer of the cathode, and thus, lithium ion conductivity may be increased and thereby enhancing the lifetime characteristics and high-rate characteristics of the lithium battery.

In the cathode, the protrusion and/or the recess may be in plurality. Since the protrusion and/or the recess may be in plurality, the plurality of pin-holes may be formed in the cathode active material layer. The wettability of the electrolyte solution may be increased by forming the plurality of pin-holes in the cathode active material layer of the cathode.

In some embodiments, the plurality of protrusions and/or recesses in the cathode may have a predetermined pattern. For example, the plurality of protrusions and/or recesses may be regularly arranged. For example, the plurality of protrusions and/or recesses may be periodically arranged. Shapes of the protrusion and the recess are not particularly limited, and any shape may be used as long as it is used in the art and may improve the wettability of the electrolyte solution. For example, the protrusion and/or recess may have the shape of a dot or line.

In some embodiments, the recess in the cathode may be a through-hole which is in contact with the metal substrate by penetrating through the conductive protective layer. That is, the through-hole formed in the conductive protective layer may correspond to the recess. The surface of the metal substrate may be exposed to the cathode active material slurry by the through-hole and may react with the cathode active material slurry to form a metal oxide.

In some embodiments, the conductive protective layer in the cathode may include the plurality of through-holes which are in contact with the metal substrate and are disposed and spaced apart by a predetermined spacing.

The conductive protective layer in the cathode may include a non-metallic material. For example, the conductive protective layer may be formed of a non-metallic material. The non-metallic material is a material that does not contain an element that is a metal and/or a semimetal, and any non-metallic material may be used as long as it is known in the art.

In some embodiments, the conductive protective layer may include a carbon-based material. The carbon-based material is not particularly limited, and any carbon-based material having conductivity may be used as long as it is known in the art. For example, the carbon-based material may be metal carbide, carbon black, lamp black, or graphite. For example, the metal carbide may be aluminum carbide. In addition, the conductive protective layer may be a mixture of the above-described carbon-based material and a polymer. The polymer may include polyacrylate, polyimide, and tetraphthalate. However, the polymer is not necessarily limited thereto, and any polymer may be used as long as it can be mixed with the carbon-based material to provide conductivity to the protective layer.

In some embodiments, the protrusion of the conductive protective layer may include a metal. For example, the protrusion may be formed of a metal. Any metal may be used as long as it is known in the art and may form a metal oxide by reacting with the cathode active material slurry. In some embodiments, the protrusion may include the same metal as the metal substrate.

In some embodiments, the conductive protective layer may include a plurality of metal dots which are disposed and spaced apart by a predetermined spacing on the protective layer in the form of a substrate that is formed of a carbon-based material.

The cathode may include the plurality of pin-holes that penetrate through the cathode active material layer. Since the cathode may include the plurality of pin-holes that penetrate through the cathode active material layer, the electrolyte solution may easily penetrate into the cathode active material layer. Thus, the electrolyte solution wettability may be increased.

The plurality of pin-holes may have a predetermined pattern. For example, the pin-holes may be regularly arranged. Since the pin-holes may be controlled to have a predetermined pattern, the wettability of the electrolyte with respect to the cathode may be easily controlled.

The cathode active material layer of the cathode may be formed from the cathode active material slurry including a cathode active material and a water-based solvent, and the cathode active material slurry may be basic.

In some embodiments, the cathode active material slurry may be basic and have a pH of about 8.0 or more. In some embodiments, the cathode active material slurry may have a pH of about 9.0 or more. In some embodiments, the cathode active material slurry may have a pH of about 10.0 or more. In some embodiments, the cathode active material slurry may have a pH of about 11.0 or more.

The water-based solvent may include about 50 wt % or more of water as the main component and may further include other polar solvents. The other polar solvents can be any solvent miscible with water and are not particularly limited thereof. For example, the other polar solvents may be methanol or ethanol.

In some embodiments, the cathode active material slurry may react with one or more of metal included in the protrusion of the conductive protective layer and metal exposed by the recess to form a metal oxide. Gas generated in a process, in which the basic cathode active material slurry reacts with the metal to form the metal oxide, may form pin-holes while penetrating the cathode active material layer. The electrolyte solution wettability of the cathode may be increased by forming the pin-holes.

In some embodiments, the thickness of the conductive protective layer may be in the range of about 10 nm to about 10 μm. For example, the thickness of the conductive protective layer in the cathode may be in the range of about 10 nm to about 5 μm. For example, the thickness of the conductive protective layer in the cathode may be in the range of about 10 nm to about 1 μm. For example, the thickness of the conductive protective layer in the cathode may be in the range of about 50 nm to about 1 μm. For example, the thickness of the conductive protective layer in the cathode may be in the range of about 100 nm to about 1 μm. For example, the thickness of the conductive protective layer may be the thickness of the protective layer in the form of a plate that does not include a protrusion. More improved battery characteristics may be obtained in the above thickness range. When the thickness of the conductive protective layer is higher than the thickness range described herein, conductivity of the cathode may decrease, and when the thickness of the conductive protective layer is lower than the range described herein, the ability of the cathode to inhibit corrosion may decrease.

In some embodiments, the height of the protrusion formed on the protective layer in the form of a plate may be in the range of about 0.01 μm to about 200 μm. For example, in the cathode, the height of the protrusion formed on the protective layer in the form of a substrate may be in the range of about 0.05 μm to about 100 μm. For example, in the cathode, the height of the protrusion formed on the protective layer in the form of a substrate may be in the range of about 0.1 μm to about 100 μm. For example, in the cathode, the height of the protrusion formed on the protective layer in the form of a substrate may be in the range of about 0.5 μm to about 100 μm. For example, in the cathode, the height of the protrusion formed on the protective layer in the form of a substrate may be in the range of about 1 μm to about 100 μm. For example, in the cathode, the height of the protrusion formed on the protective layer in the form of a substrate may be in the range of about 10 μm to about 100 μm. More improved battery characteristics may be obtained in the above height range of the protrusion. When the height of the protrusion is higher than the range described herein, ionic conductivity and electrode plate flexibility may be decreased, and when the height of the protrusion is lower than the range described herein, the battery capacity may be decreased.

In some embodiments, when the protrusion in the cathode is in the shape of a dot, the diameter of the dot may be in a range of about 0.01 μm to about 100 μm. For example, the diameter of the dot may be in a range of about 0.05 μm to about 10 μm. For example, the diameter of the dot may be in a range of about 0.1 μm to about 10 μm. For example, the diameter of the dot may be in a range of about 0.5 μm to about 10 μm. For example, the diameter of the dot may be in a range of about 1 μm to about 10 μm. More improved battery characteristics may be obtained in the above diameter range of the dot.

In some embodiments, when the protrusion in the cathode is in the shape of a dot, the spacing between the dots may be in a range of about 0.01 μm to about 100 μm. For example, the spacing between the dots in the cathode may be in the range of about 0.05 μm to about 100 μm. For example, the spacing between the dots in the cathode may be in the range of about 0.1 μm to about 100 μm. For example, the spacing between the dots in the cathode may be in the range of about 0.5 μm to about 100 μm. For example, the spacing between the dots may be in the range of about 1 μm to about 100 μm. More improved battery characteristics may be obtained in the above spacing range of the dots.

In some embodiments, the diameter of the through-hole formed by penetrating the conductive protective layer and exposing the metal substrate, i.e., the recess, may be in the range of about 0.01 μm to about 1,000 μm. For example, the diameter of the recess in the cathode may be in the range of about 0.05 μm to about 500 μm. For example, the diameter of the recess in the cathode may be in the range of about 0.1 μm to about 400 μm. For example, the diameter of the recess in the cathode may be in the range of about 0.5 μm to about 300 μm. For example, the diameter of the recess in the cathode may be in the range of about 1 μm to about 200 μm. More improved battery characteristics may be obtained in the above diameter range of the recess.

A method of preparing a cathode may include preparing a current collector that includes a metal substrate; and a conductive protective layer disposed on the metal substrate and including at least one of a protrusion and a recess which react with base; and coating the conductive protective layer of the current collector with a cathode active material slurry.

In some embodiments, the preparing of the current collector may include preparing the metal substrate; forming a conductive coating layer on the metal substrate; and forming a conductive protective layer by forming protrusions on the conductive coating layer.

The metal substrate is not particularly limited and can be any suitable metal that may be oxidized by a basic solution, and for example, may be aluminum.

In the method of preparing a cathode, the conductive protective layer may include a carbon-based material. For example, the conductive coating layer may be formed by coating with a carbon-based material. The method of forming the carbon-based coating layer is not particularly limited, and any suitable method may be used as long as that the method can form a carbon coating layer in the art. For example, spin coating, dip coating, sputtering, or chemical vapor deposition (CVD) may be used.

The method of forming protrusions on the conductive coating layer, for example, may be a method, in which a mask having a predetermined pattern is disposed on the carbon coating layer, the mask is coated with a metal layer, and the metal layer having a predetermined pattern is then selectively formed by removing the mask. However, any method may be used as long as it is a method of forming a metal layer having a predetermined pattern in the art and the method is not limited thereof. The method may include both dry and wet methods. The metal layer may be a layer formed of a plurality of metal dots or metal seeds that are disposed and spaced apart by a predetermined spacing. That is, in the preparation method described herein, the conductive protective layer may include a plurality of metal dots that are disposed and spaced apart by a predetermined spacing on the protective layer formed of a carbon-based material.

In some embodiments, the preparing of the current collector may include preparing the metal substrate; and forming a conductive protective layer having a predetermined pattern on the metal substrate.

The forming of the conductive protective layer having a predetermined pattern may be performed in such a manner that a mask having a predetermined pattern is disposed on the metal substrate, the metal substrate having the mask is coated with a carbon layer, and the carbon layer having a predetermined pattern is then selectively formed by removing the mask. In some embodiments, the carbon layer may form a conductive protective layer including through-holes, in which a carbon layer is regularly not formed on a portion thereof. That is, the recess may be a through-hole that is in contact with the metal substrate by penetrating the conductive protective layer.

In the method of preparing a cathode, the cathode active material slurry may be basic. For example, the cathode active material slurry may have a pH of about 10.0 or higher. For example, the cathode active material slurry may have a pH of about 11.0 or higher.

When the conductive protective layer of the current collector is coated with the basic water-based cathode active material slurry, bubbles may occur in a process of forming a metal oxide by the reaction of the slurry with the metal included in the protrusions of the conductive protective layer and/or the substrate metal that is exposed by the recesses of the conductive protective layer. In a process in which the bubbles are removed though the slurry, a plurality of pinholes, which penetrate a cathode active material layer that is obtained by curing the cathode active material slurry, may be formed.

The cathode active material used in the preparation of the cathode is not particularly limited as long as it may be used in a lithium battery and may exhibit basicity in a water-based solvent.

The cathode active material used in the method of preparing a cathode may include a compound expressed by Chemical Formulas 1 to 5 below:

$$Li_xCo_{1-y}M_yO_{2-\alpha}X_\alpha \qquad \text{Chemical Formula 1}$$

$$Li_xCo_{1-y-z}Ni_yM_zO_{2-\alpha}X_{60} \qquad \text{Chemical Formula 2}$$

$$Li_xMn_{2-y}M_yO_{4-\alpha}X_\alpha \qquad \text{Chemical Formula 3}$$

$$Li_xCo_{2-y}M_yO_{4-\alpha}X_\alpha \qquad \text{Chemical Formula 4}$$

$$Li_xM^1{}_yM_zPO_{4-\alpha}X_\alpha \qquad \text{Chemical Formula 5}$$

wherein $0.90 \leq x \leq 1.1$, $0 \leq y \leq 0.9$, $0 \leq z \leq 0.5$, $1-y-z>0$, and $0 \leq \alpha \leq 2$, $M^1$ is one or more metals selected from the group consisting of titanium (Ti), vanadium (V), chromium (Cr), manganese (Mn), iron (Fe), cobalt (Co), nickel (Ni), copper (Cu), aluminum (Al), magnesium (Mg), zirconium (Zr), and boron (B). M is at least one element selected from the group consisting of Magnesium (Mg), calcium (Ca), strontium (Sr), barium (Ba), Titanium (Ti), Zirconium (Zr), niobium (Nb), molybdenum (Mo), tungsten (W), zinc (Zn), Aluminum (Al), silicon (Si), Nickel (N)i, Manganese (Mn), Chromium (Cr), Iron (Fe), vanadium (V), and rare earth elements, and X is an element selected from the group consisting of oxygen (O), fluorine (F), sulfur (S), and phosphorus (P).

The cathode active material usable in the method of preparing a cathode, for example, may include a compound expressed by Chemical Formulas 6 and 7 below:

$$Li[Li_aMe_{1-a}]O_{2+d} \qquad \text{Chemical Formula 6}$$

$$Li[Li_bM^1{}_cM'_e]O_{2+d} \qquad \text{Chemical Formula 7}$$

wherein $0<a<1$, $b+c+e=1$; $0<b<1$, $0<e<0.1$; and $0 \leq d \leq 0.1$, Me is one or more metals selected from the group consisting of Titanium (Ti), Vanadium (V), Chromium (Cr), Manganese (Mn), Iron (Fe), Cobalt (Co), Nickel (Ni), Copper (Cu), Aluminum (Al), Magnesium (Mg), Zirconium (Zr), and Boron (B), and M' is one or more metals selected from the group consisting of molybdenum (Mo), Tungsten (W), iridium (Ir), Nickel (Ni), and Magnesium (Mg). In some embodiments, $0<a<0.33$.

Also, the cathode active material usable in the method of preparing a cathode may include a compound expressed by Chemical Formulas 8 and 9 below:

$$pLi_2MO_3(1-p)LiMeO_2 \qquad \text{Chemical Formula 8}$$

$$xLi_2MO_{3-y}LiM^1O_{2-z}Li_{1+d}M'_{2-d}O_4 \qquad \text{Chemical Formula 9}$$

wherein $0<p<1$, $x+y+z=1$; $0<x<1$, $0<y<1$, $0<z<1$; and $0 \leq d \leq 0.33$; M is one or more metals selected from the group consisting of Magnesium (Mg), calcium (Ca), strontium (Sr), barium (Ba), Titanium (Ti), Zirconium (Zr), niobium (Nb), molybdenum (Mo), tungsten (W), zinc (Zn), Aluminum (Al), silicon (Si), Nickel (N)i, Manganese (Mn), Chromium (Cr), Iron (Fe), vanadium (V), and rare earth elements; $M^1$ is one or more metals selected from the group consisting of titanium (Ti), vanadium (V), chromium (Cr), manganese (Mn), iron (Fe), cobalt (Co), nickel (Ni), copper (Cu), aluminum (Al), magnesium (Mg), zirconium (Zr), and boron (B); and M' is one or more metals selected from the group consisting of titanium (Ti), vanadium (V), chromium (Cr), manganese (Mn), iron (Fe), cobalt (Co), nickel (Ni), copper (Cu), aluminum (Al), magnesium (Mg), zirconium (Zr), and boron (B).

The compound of Chemical Formula 8 may have a layered structure, and in the compound of Chemical Formula 9, $Li_2MO_3LiM^1O_2$ may have a layered structure and $Li_{1+d}M'_{2-d}O_4$ may have a spinel structure.

For example, the cathode may be prepared by the following method.

The cathode may be prepared by forming a cathode active material composition including the cathode active material and a binder into a predetermined shape or may be prepared by coating the above-described current collector that includes the conductive protective layer having one or more of a protrusion or a recess which react with base with the cathode active material composition. The metal substrate of the current collector may be aluminum. The cathode active material composition is a basic composition.

In some embodiments, a basic cathode active material composition is prepared, in which the cathode active material, a conductive agent, a binder and a solvent are mixed together. The basic cathode active material composition may be directly coated on the above-described metal current collector to prepare a cathode plate.

The cathode active material included in the cathode active material composition is not particularly limited as long as it is used in the art and may make the cathode active material composition basic.

For example, the cathode active material may include one or more selected from the group consisting of lithium cobalt oxide, lithium nickel cobalt manganese oxide, lithium nickel cobalt aluminum oxide, lithium iron phosphate, or lithium manganese oxide. However, the cathode active material is not necessarily limited thereto.

For example, a compound expressed as one of the following chemical formulas may be used as the cathode active material: $Li_aA_{1-b}B_bD_2$ (where $0.90 \leq a \leq 1.8$, $0 \leq b \leq 0.5$); $Li_aE_{1-b}B_bO_{2-c}D_c$ (where $0.90 \leq a \leq 1.8$, $0 \leq b \leq 0.5$, $0 \leq c \leq 0.05$); $LiE_{2-b}B_bO_{4-c}D_c$ (where $0 \leq b \leq 0.5$, $0 \leq c \leq 0.05$); $Li_aNi_{1-b-c}Co_bB_cD_\alpha$ (where $0.90 \leq a \leq 1.8$, $0 \leq b \leq 0.5$, $0 \leq c \leq 0.05$, $0<\alpha \leq 2$); $Li_aNi_{1-b-c}Co_bB_cO_{2-\alpha}F_\alpha$ (where $0.90 \leq a \leq 1.8$, $0 \leq b \leq 0.5$, $0 \leq c \leq 0.05$, $0<\alpha<2$); $Li_aNi_{1-b-c}Co_bB_cO_{2-\alpha}F_2$ (where $0.90 \leq a \leq 1.8$, $0 \leq b \leq 0.5$, $0 \leq c \leq 0.05$, $0<\alpha<2$); $Li_aNi_{1-b-c}Mn_bB_cD_\alpha$ (where $0.90 \leq a \leq 1.8$, $0 \leq b \leq 0.5$, $0 \leq c \leq 0.05$, $0<\alpha \leq 2$); $Li_aNi_{1-b-c}Mn_bB_cO_{2-\alpha}F_\alpha$ (where $0.90 \leq a \leq 1.8$, $0 \leq b \leq 0.5$, $0 \leq c \leq 0.05$, $0<\alpha<2$); $Li_aNi_{1-b-c}Mn_bB_cO_{2-\alpha}F_2$ (where $0.90 \leq a \leq 1.8$, $0 \leq b \leq 0.5$, $0 \leq c \leq 0.05$, $0<\alpha<2$); $Li_aNi_bE_cG_dO_2$ (where $0.90 \leq a \leq 1.8$, $0 \leq b \leq 0.9$, $0 \leq c \leq 0.5$, $0.001 \leq d \leq 0.1$); $Li_aNi_bCo_cMn_dGeO_2$ (where $0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ (where $0.90 \leq a \leq 1.8$, $0.001 \leq b \leq 0.1$); $Li_aCoG_bO_2$ (where $0.90 \leq a \leq 1.8$, $0.001 \leq b \leq 0.1$); $Li_aMnG_bO_2$ (where $0.90 \leq a \leq 1.8$, $0.001 \leq b \leq 0.1$); $Li_aMn_2G_bO_4$ (where $0.90 \leq a \leq 1.8$, $0.001 \leq b \leq 0.1$); $QO_2$; $QS_2$; $LiQS_2$; $V_2O_5$; $LiV_2O_5$; $LiI^1O_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the above chemical formulas, A is Ni, Co, Mn, or a combination thereof; B is Al, Ni, Co, Mn, Cr, Fe, Mg, Sr, V, rare earth elements, or a combination thereof; D is O, F, S, P, or a combination thereof; E is Co, Mn, or a combination thereof; F is F, S, P, or a combination thereof; G is Al, Cr, Mn, Fe, Mg, lanthanum (La), cerium (Ce), Sr, V, or a combination thereof; Q is Ti, Mo, Mn, or a combination thereof; $I^1$ is Cr, V, Fe, scandium (Sc), yttrium (Y), or a combination thereof; J is V, Cr, Mn, Co, Ni, Cu, or a combination thereof.

In some embodiments, a compound having a coating layer on the foregoing compounds may be used, or a compound may be used by mixing the foregoing compounds and the compound having a coating layer. The coating layer may include a compound of a coating element such as oxide, hydroxide, oxyhydroxide, oxycarbonate, or hydroxycarbonate of a coating element. The compound constituting the coating layer may be amorphous or crystalline. Examples of the coating element included in the coating layer may be Mg, Al, Co, potassium (K), sodium (Na), Ca, Si, Ti, V, tin (Sn), germanium (Ge), gallium (Ga), B, arsenic (As), Zr, or mixtures thereof. Any coating method may be used for a process of forming a coating layer as long as coating may be performed by a method (e.g., spray coating, dipping, etc.) that does not adversely affect the physical properties of the cathode active material due to using such coating elements on the foregoing compounds. Detailed description related to the coating method is not provided because it is obvious to those skilled in the art.

Examples of the cathode active material may be $LiNiO_2$, $LiCoO_2$, $LiMn_xO_{2x}$ (x=1, 2), $LiNi_{1-x}Mn_xO_2$ (0<x<1), $LiNi_{1-x-y}Co_xMn_yO_2$ (0<x<1, 0<y<1, 1-x-y >0), $LiFeO_2$, $V_2O_5$, TiS, MoS, etc.

Carbon black and fine graphite particles may be used as the conductive agent. However, the conductive agent is not limited thereto and any conductive agent may be used as long as it is known in the art.

A vinylidene fluoride/hexafluoropropylene copolymer, polyvinylidene fluoride (PVDF), polyacrylonitrile, poly(methyl methacrylate), polytetrafluoroethylene, and mixtures thereof, or a styrene butadiene rubber-based polymer may be used as the binder. However, the binder is not limited thereto and any binder may be used as long as it is known in the art.

Examples of the solvent may be N-methylpyrrolidone, acetone, and water. However, the solvent is not limited thereto and any solvent may be used as long as it is known in the art.

The contents of the cathode active material, conductive agent, binder, and solvent are amounts typically used in a lithium battery. One or more of the conductive agent and binder may be omitted according to applications and configurations of lithium batteries.

A lithium battery according to another embodiment of the present disclosure may include the cathode including the cathode active material. The lithium battery may be prepared according to the following method.

First, a cathode is prepared according to the method of preparing a cathode.

Next, an anode active material composition is prepared, in which an anode active material, a conductive agent, a binder, and a solvent are mixed together. An anode plate is prepared by directly coating the anode active material composition on a metal current collector and drying the coated current collector. Alternatively, the anode active material composition is cast on a separate support, and then an anode plate may be prepared by laminating films detached from the support on a metal current collector.

Any anode active material may be used the anode active material as long as it is a compound capable of intercalating/deintercalating lithium ions and is used in the art. For example, the anode active material may include one or more selected from the group consisting of lithium metal, a metal alloyable with lithium, transition metal oxide, non-transition metal oxide, and a carbon-based material.

Examples of the metal alloyable with lithium may be Si, Sn, Al, Ge, lead (Pb), bismuth (Bi), antimony (Sb), an Si—Y alloy (where Y is alkaline metal, alkaline earth metal, a group 13 element, a group 14 element, transition metal, a rare earth element, or a combined element thereof, and is not Si), an Sn—Y alloy (where Y is alkaline metal, alkaline earth metal, a group 13 element, a group 14 element, transition metal, a rare earth element, or a combined element thereof, and is not Sn), etc. Examples of the element Y may be Mg, Ca, Sr, Ba, radium (Ra), Sc, Y, Ti, Zr, hafnium (Hf), rutherfordium (Rf), V, Nb, tantalum (Ta), dubnium (Db), Cr, Mo, W, seaborgium (Sg), technetium (Tc), rhenium (Re), bohrium (Bh), Fe, Pb, ruthenium (Ru), osmium (Os), hassium (Hs), rhodium (Rh), Ir, palladium (Pd), platinum (Pt), Cu, silver (Ag), gold (Au), Zn, cadmium (Cd), B, Al, Ga, Sn, indium (In), Ge, P, As, Sb, Bi, S, selenium (Se), tellurium (Te), polonium (Po), and combinations thereof.

In some embodiments, the transition metal oxide may be lithium titanate, vanadium oxide, lithium vanadium oxide, etc.

In some embodiments, the non-transition metal oxide may be $SnO_2$, $SiO_x$ (0<x<2), etc.

The carbon-based material may be crystalline carbon, amorphous carbon, or a mixture thereof. The crystalline carbon may be graphite such as shapeless, plate, flake, spherical, or fibrous natural graphite or artificial graphite, and the amorphous carbon may be soft carbon (low-temperature fired carbon) or hard carbon, mesophase pitch carbide, fired coke, etc.

Specifically, the anode active material may include one or more selected from the group consisting of graphite, Si, Sn, Pb, Ge, Al, $SiO_x$ (0<x≤2), $SnO_y$ (0<y≤2), $Li_4Ti_5O_{12}$, $TiO_2$, $LiTiO_3$, and $Li_2Ti_3O_7$.

The conductive agent, binder, and solvent that are used in the anode active material composition may be the same as those of the cathode active material composition. Pores in the electrode plate may be formed by further adding a plasticizer to the cathode active material composition and/or the anode active material composition.

The contents of the anode active material, conductive agent, binder, and solvent are amounts typically used in a lithium battery. One or more of the conductive agent, binder, and solvent may be omitted according to applications and configurations of lithium batteries.

Next, a separator, which will be inserted between the cathode and the anode, is prepared. Any separator that is typically used in a lithium battery may be used as the separator. A separator having high moisture-retention ability for an electrolyte as well as low resistance to the transfer of electrolyte ions may be used. Examples of the separator may be one selected from the group consisting of glass fibers, polyester, Teflon, polyethylene, polypropylene, polytetrafluoroethylene (PTFE), and combinations thereof. The separator may be a nonwoven or woven fabric type. For example, a windable separator such as polyethylene or polypropylene is used in a lithium-ion battery, and a separator having high moisture-retention ability for an organic electrolyte may be used in a lithium-ion polymer battery. In some embodiments, the separator may be prepared according to the following method.

A separator composition is prepared by mixing a polymer resin, a filler, and a solvent. The separator composition is directly coated on an upper portion of an electrode and dried to prepare a separator. Additionally, the separator composition is cast and dried on a support, and a separator may then be prepared by laminating separator films detached from the support on an upper portion of an electrode.

A polymer resin used in the preparation of the separator is not particularly limited and any material used in a binder for an electrode plate may be used. Examples of the polymer resin may be vinylidene fluoride/hexafluoropropylene copolymer, PVDF, polyacrylonitrile, poly(methyl methacrylate), and mixtures thereof.

Next, an electrolyte is prepared.

In some embodiments, the electrolyte may be an organic electrolyte. Also, the electrolyte may be a solid. For example, the electrolyte may be boron oxide, lithium oxynitride, etc. However, the electrolyte is not limited thereto and any electrolyte may be used as long as it is used in the art. The solid electrolyte may be formed on the anode by using a method such as sputtering.

For example, an organic electrolyte may be prepared. The organic electrolyte may be prepared by dissolving a lithium salt in an organic solvent.

Any organic solvent may be used as long as it is used in the art. Examples of the organic solvent may be propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, diethyleneglycol, dimethylether, and mixtures thereof.

Any lithium salt may be used as long as it is used in the art. Examples of the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are natural numbers), LiCl, LiI, and mixtures thereof.

Figure 5:
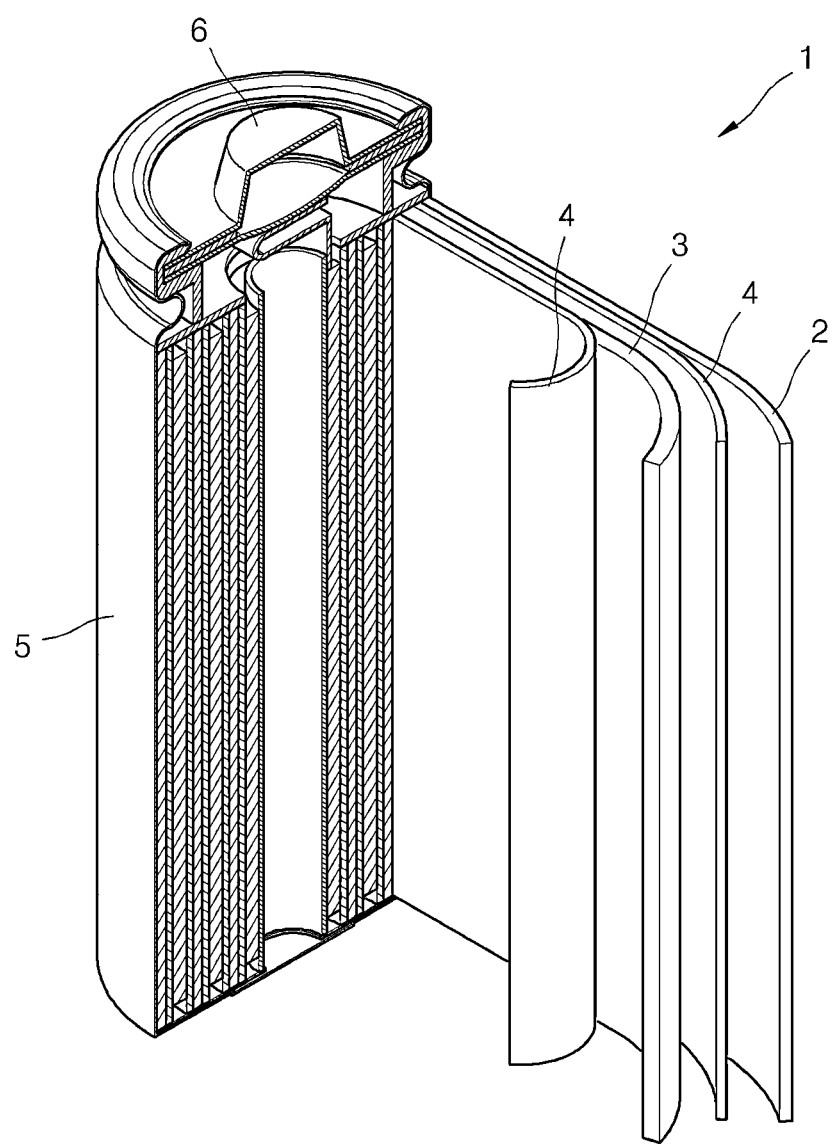
FIG. 5 is a non-limiting example of the schematic diagram of a lithium battery.

As shown in FIG. 5, the lithium battery 1 includes a cathode 3, an anode 2, and a separator 4. The cathode 3, anode 2, and separator 4 are wound and folded to be contained in a battery case 5. Subsequently, an organic electrolyte solution is injected into the battery case 5 and the lithium battery 1 is completed by being sealed with a cap assembly 6. The battery case 5 may be a cylindrical, rectangular, or thin-film type. For example, the lithium battery 1 may be a thin-film type battery. The lithium battery 1 may be a lithium-ion battery.

The separator is disposed between the cathode and the anode such that a battery structure may be formed. The battery structure is stacked in a bi-cell structure, and then impregnated in an organic electrolyte solution. A lithium-ion polymer battery is completed when a product thus obtained is contained in a pouch and sealed.

The battery structures are stacked to form a battery pack, and the battery pack may be used in all devices demanding high capacity and high power. For example, the battery pack may be used in a notebook, smartphone, or electric vehicle (EV).

In particular, because the lithium battery has excellent high-temperature charge and discharge characteristics and high-temperature stability, it may be used in an EV. For example, the lithium battery may be suitable for a hybrid vehicle such as a plug-in or hybrid electric vehicle (PHEV).

The present technology is described in more detail according to examples and comparative examples below. However, the examples only exemplify the present invention, and the scope of the present invention is not limited thereto.

Preparation of Current Collector

PREPARATION EXAMPLE 1

Preparation of Current Collector in which Through-Holes are Formed in Carbon Coating Layer A carbon coating layer with a thickness of about 500 nm was deposited on an aluminum current collector by a CVD method. A plurality of masks each having width and length of about 100 μm×100 μm was disposed on the aluminum current collector during the carbon deposition, and then the aluminum current collector coated with the carbon coating layer, in which a plurality of through-holes were formed, was prepared by removing the masks after the deposition was completed. The spacing between the masks was about 100 μm.

PREPARATION EXAMPLE 2

Preparation of Current Collector in which Aluminum Dot Layer is Formed on Carbon Coating Layer A carbon coating layer with a thickness of about 500 nm was deposited on an aluminum current collector by a CVD method. Aluminum dots having a height of about 50 μm and a diameter of about 50 μm were formed by jetting aluminum ink on the carbon coating layer at a spacing of about 100 μm using an E-jetting (electrohydrodynamic jetting) method.

COMPARATIVE PREPARATION EXAMPLE 1

Current Collector without Carbon Coating Layer

A aluminum foil with a thickness of about 15 μm was used as a current collector.

COMPARATIVE PREPARATION EXAMPLE 2

Current Collector with Carbon Coating Layer and without Holes

A carbon coating layer with a thickness of about 500 nm was deposited on an aluminum current collector by a CVD method to prepare the carbon-coated current collector. The carbon-coated current collector was the same as that of Preparation Example 1 except that it did not have through-holes in the carbon coating layer.

Preparation of Cathode and Lithium Battery

EXAMPLE 1

About 97 g of $Li(Ni_{0.5}Co_{0.2}Mn_{0.3})O_2$ (NCM) powder having an average particle diameter of about 20 μm, about 1.5 g of acetylene black powder having an average particle diameter of about 40 nm to about 50 nm as a conductive agent, about 0.6 g of carboxymethyl cellulose (CMC) as a thickener, and about 17 g of water were mixed and stirred using a mechanical stirrer for about 30 minutes. Then, a water-based cathode active material slurry with a pH of about 11 was prepared by further adding about 2 g of water and about 2 g of an acrylic binder.

The current collector prepared in Preparation Example 1 was coated with the slurry to a thickness of about 150 μm by using a doctor blade, and a cathode plate was prepared by drying in a vacuum again at about 110° C. The cathode plate was rolled by a roll press to be formed as a sheet.

The coin cell (2016 type) having a diameter of about 16 mm was prepared by using the cathode plate. Metallic lithium was used as a counter electrode during the preparation of the coin cell, an about 20 μm thick polyethylene separator (Star® 20) was used as a separator, and an electrolyte used was prepared by dissolving about 1.15 M $LiPF_6$ in a solvent mixture of ethylene carbonate (EC): ethylmethyl carbonate (EMC):diethyl carbonate (DEC) (a volume ratio of about 3:3:4).

EXAMPLE 2

Cathode and lithium battery were prepared in the same manner as in Example 1 except that about 97 g of $LiCoO_2$ powder was used instead of 97 g of NCM cathode active material powder.

EXAMPLE 3

Cathode and lithium battery were prepared in the same manner as in Example 1 except that about 97 g of $Li(Ni_{0.5}Co_{0.2}Al_{0.3})O_2$ (NCA) powder was used instead of 97 g of NCM cathode active material powder.

EXAMPLE 4

Cathode and lithium battery were prepared in the same manner as in Example 1 except that the current collector prepared in Preparation Example 2 was used instead of the current collector prepared in Preparation Example 1.

EXAMPLE 5

Cathode and lithium battery were prepared in the same manner as in Example 1 except that about 97 g of $LiFePO_4$ powder was used instead of 97 g of NCM cathode active material powder.

COMPARATIVE EXAMPLE 1

Cathode and lithium battery were prepared in the same manner as in Example 1 except that the current collector prepared in Comparative Preparation Example 1 was used and a water-based cathode active material slurry was prepared by mixing a mixture of about 97 g of $Li(Ni_{0.5}Co_{0.2}Mn_{0.3})O_2$ powder having an average particle diameter of about 20 μm, about 1.5 g of acetylene black powder having an average particle diameter of about 40 nm to about 50 nm as a conductive agent, and about 2.6 g of polyvinylidene fluoride (PVDF) as a binder with N-methylpyrrolidone (NMP) solvent in an agate mortar.

COMPARATIVE EXAMPLE 2

Cathode and lithium battery were prepared in the same manner as in Example 1 using a water-based cathode active material slurry except that the current collector prepared in Comparative Preparation Example 1 was used.

However, since the aluminum current collector actively reacted with the water-based cathode active material slurry, a reproducible, uniform cathode was not prepared.

COMPARATIVE EXAMPLE 3

Cathode and lithium battery were prepared in the same manner as in Example 1 except that the current collector prepared in Comparative Preparation Example 2 was used.

EVALUATION EXAMPLE 1

Electrolyte Solution Wettability Evaluation

Surfaces of cathode active material layers of the cathodes prepared in Example 1 and Comparative Example 1 were coated with about 30 ml of the same electrolyte solution as used in the preparation of the batteries, and an amount of the electrolyte solution remaining on the surfaces of the cathodes over time was then visually evaluated.

Figure 1D:
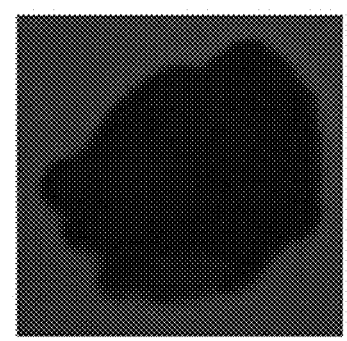

As illustrated in FIGS. 1A to 1D, in the cathode of Comparative Example 1, most electrolyte solution remained as it is on the surface of the cathode immediately after the coating of the electrolyte solution (0 minutes, FIG. 1A), after about 2 minutes (FIG. 1B), after about 10 minutes (FIG. 1C), and even after about 20 minutes (FIG. 1D).

Figure 2A:
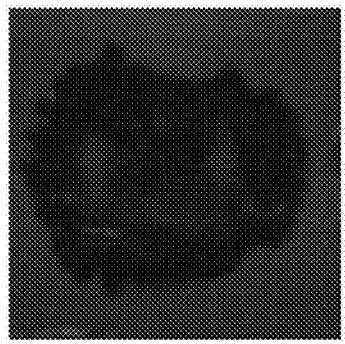
FIGS. 2A to 2C are non-limiting examples of surface images obtained after coating a cathode plate.
Figure 2B:
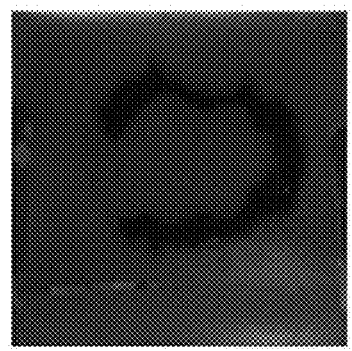
Figure 2C:

In contrast, as illustrated in FIGS. 2A to 2C, in the cathode of Example 1, the cathode was impregnated with some of the electrolyte solution immediately after the coating of the electrolyte solution (FIG. 2A), and the cathode was impregnated with most of the electrolyte solution after about 5 minutes (FIG. 2B) and after about 20 minutes (FIG. 2C).

Therefore, it may be understood that the cathode prepared in Example 1 had a significantly increased wettability with respect to the electrolyte solution in comparison to the cathode prepared in Comparative Example 1.

EVALUATION EXAMPLE 2

Charge and Discharge Characteristics Evaluation

The coin cells prepared in Examples 1 to 5 and Comparative Examples 1 to 3 were charged at a 0.1 C constant current rate to a voltage of 4.2 V (vs. lithium (Li)) at about 25° C. and discharged at a 0.1 C constant current rate until the voltage reached 3 V (vs. Li) during discharge (formation operation).

The lithium batteries subject to the above formation operation were charged at a 1.0 C constant current rate to a voltage of 4.2 V (vs. Li) at about 25° C. and discharged at a 1.0 C constant current rate until the voltage reached 3 V (vs. Li) during discharge. The above cycle was repeated 100 times. Some of the results of charge and discharge experiments are presented in Table 1 and FIG. 3 below. A charge and discharge efficiency and a capacity retention ratio are defined as the following Equations 1 and 2, respectively.

Initial charge and discharge efficiency [%]=[discharge capacity in a $1^{st}$ cycle/charge capacity in the $1^{st}$ cycle]×100     Equation 1

Capacity retention ratio [%]=[discharge capacity in a $100^{th}$ cycle/discharge capacity in the $1^{st}$ cycle)× 100     Equation 2

TABLE 1

| | Initial charge and discharge efficiency [%] | Capacity retention ratio in a 100th cycle [%] | Discharge capacity in the 1st cycle [mAh/g] |
|---|---|---|---|
| Example 1 | 89 | 96.3 | 138 |
| Comparative Example 1 | 89 | 86.2 | 129 |

Figure 3:
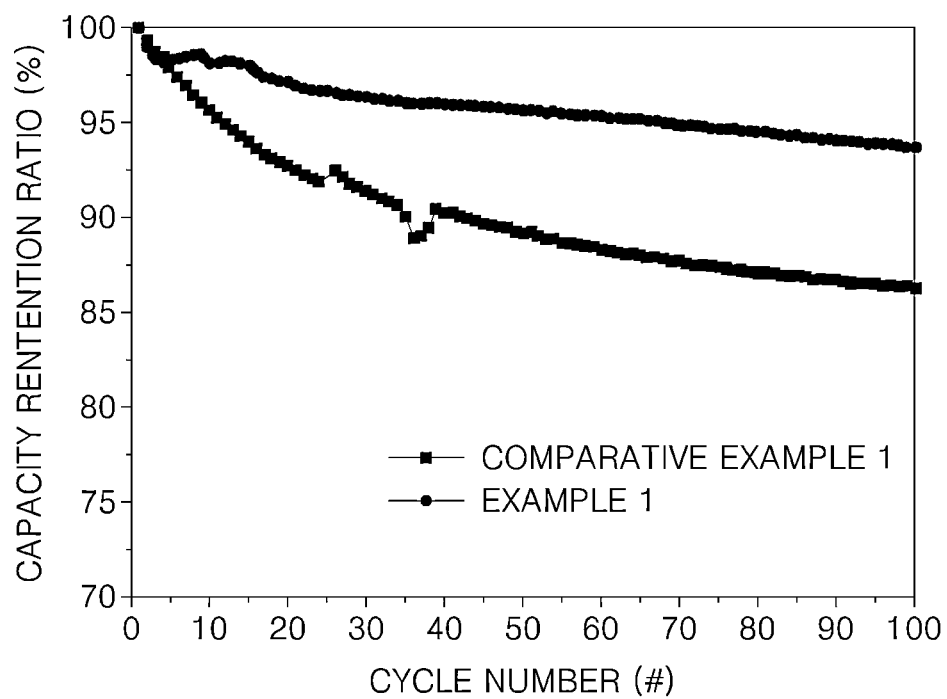
FIG. 3 is a graph illustrating the results of the measurement of lifetime characteristics of lithium batteries prepared in Example 1 and Comparative Example 1.

As illustrated in Table 1 and FIG. 3, the lithium battery of Example 1 exhibited more improved lifetime characteristics and discharge capacity than the lithium battery of Comparative Example 1.

The lithium battery of Example 1 also exhibited more improved lifetime characteristics than the lithium battery of Comparative Example 3.

EVALUATION EXAMPLE 3

High-Rate Charge and Discharge Experiment

The coin cells prepared in Examples 1 to 5 and Comparative Examples 1 to 3 were charged at a 0.1 C constant current rate to a voltage of 4.2 V (vs. Li) at about 25° C. and discharged at a 0.1 C constant current rate until the voltage reached 3 V (vs. Li) during discharge (formation operation).

The lithium batteries subject to the above formation operation were charged at a 0.1 C constant current rate to a voltage of 4.2 V (vs. Li) at about 25° C. and discharged at a constant current until the voltage reached 3 V (vs. Li) while current density during discharge was increased. The current density during discharge was sequentially increased while the charge and discharge cycle was repeated. The current densities during discharge were 0.1 C, 0.2 C, 0.5 C, 1 C, 2 C, and 5 C rates, respectively. Some of the results of high-rate charge and discharge experiments are presented in Table 2 and FIG. 4 below.

TABLE 2

| C-rate | Example 1 Rate capability [%] | Comparative Example 1 Rate capability [%] |
|---|---|---|
| 0.1 | 100 | 100 |
| 0.2 | 96.9 | 96.4 |
| 0.5 | 94.9 | 92.1 |
| 1 | 92.1 | 89.5 |
| 2 | 90 | 84.5 |
| 3 | 88.6 | 82 |

The rate capabilities are values representing relative capacities that are obtained at 0.2 C, 0.5 C, 1 C, 2 C, and 3 C rates when discharge capacity at 0.1 C is defined as 100%.

Figure 4:
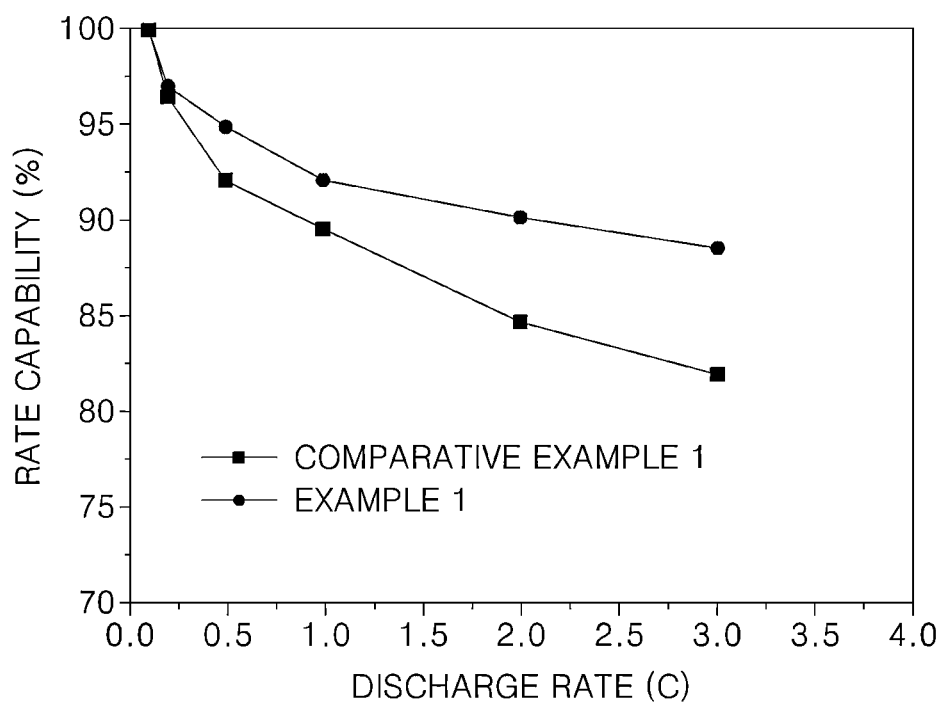
FIG. 4 is a graph illustrating the results of the measurement of high-rate characteristics of lithium batteries prepared in Example 1 and Comparative Example 1.

As illustrated in Table 2 and FIG. 4, the lithium battery of Example 1 exhibited more improved high-rate characteristics than the lithium battery of Comparative Example 1.

As described above, according to the one or more of the above embodiments of the present invention, lifetime characteristics and high-rate characteristics of a lithium battery may be improved by including a cathode having improved electrolyte solution wettability.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A cathode comprising:
   a current collector;
   a cathode active material layer disposed on the current collector; and
   a plurality of pin-holes that penetrate through the cathode active material layer, wherein the current collector comprises a metal substrate and a conductive protective layer disposed on at least a portion of the metal substrate,
   wherein (i) the conductive protective layer comprises a plurality of protrusions and the plurality of recesses which react with base, (ii) the plurality of protrusions and the plurality of recesses have a predetermined pattern, (iii) the plurality of recesses are through-holes which are in contact with the metal substrate by penetrating through the conductive protective layer, and (iv) the plurality of protrusions of the conductive protective layer comprise metal.

2. The cathode of claim 1, wherein the conductive protective layer comprises a plurality of through-holes which are in contact with the metal substrate and are disposed and spaced apart by a predetermined spacing.

3. The cathode of claim 1, wherein the conductive protective layer comprises a non-metallic material.

4. The cathode of claim 1, wherein the conductive protective layer comprises a carbon-based material.

5. The cathode of claim 1, wherein the plurality of protrusions and the metal substrate comprises the same metal.

6. The cathode of claim 1, wherein the conductive protective layer comprises a plurality of metal dots which are disposed and spaced apart by a predetermined spacing on the conductive protective layer that is formed of a carbon-based material.

7. The cathode of claim 1, wherein the plurality of pin-holes have a predetermined pattern.

8. The cathode of claim 1, wherein the cathode active material layer is formed from a cathode active material slurry including a cathode active material and a water-based solvent, and wherein the cathode active material slurry is basic.

9. The cathode of claim 8, wherein the cathode active material slurry reacts with metal included in the plurality of protrusions of the conductive protective layer and metal exposed by the plurality of recesses to form a metal oxide.

10. A lithium battery comprising the cathode of claim 1.

* * * * *